United States Patent [19]
Ishida et al.

[11] Patent Number: 6,075,539
[45] Date of Patent: Jun. 13, 2000

[54] METHOD AND APPARATUS FOR DISPLAYING CAD GEOMETRIC OBJECT AND STORAGE MEDIUM STORING GEOMETRIC OBJECT DISPLAY PROCESSING PROGRAMS

[75] Inventors: Tomotoshi Ishida, Hitachinaka; Munetoshi Unuma, Hitachi; Shiro Nonaka, Hitachinaka; Yoshiaki Usami; Toshiaki Yoshinaga, both of Hitachi; Yoshiko Tanaka, Yokohama, all of Japan

[73] Assignee: Hitachi, Ltd, Tokyo, Japan

[21] Appl. No.: 09/019,195

[22] Filed: Feb. 5, 1998

[30] Foreign Application Priority Data

Feb. 7, 1997 [JP] Japan ...................................... 9-025031

[51] Int. Cl.[7] ...................................................... G06F 15/00
[52] U.S. Cl. .................................................................. 345/419
[58] Field of Search .................................... 345/419, 421, 345/425, 433, 112, 113, 114

[56] References Cited

U.S. PATENT DOCUMENTS 5,923,329   7/1999   Beale ........................................ 345/418
5,929,864   7/1999   Picott et al. ............................. 345/440

*Primary Examiner*—Phu K. Nguyen
*Attorney, Agent, or Firm*—Antonelli, Terry, Stout & Kraus, LLP

[57] ABSTRACT

A geometric object display method and apparatus and a computer-readable storage medium storing a geometric object display process program, capable of displaying the image of a composite geometric object such that the outline of the object can be grasped by the user at an earlier stage. Composite geometric element data input from an input unit is divided into a plurality of geometric element data sets of each part by a sub-grouping unit of a computing unit. The display sequence of the sub-grouped geometric element data is scheduled by a sequence scheduling unit, and the sequenced geometric element data is output by an output unit such as a display device. The outline of a composite geometric object can be grasped at an earlier stage when only a fraction of geometric element data is displayed.

32 Claims, 11 Drawing Sheets

| PART C | GEOMETRIC ELEMENT |
| | GEOMETRIC ELEMENT |
| | GEOMETRIC ELEMENT |
| | GEOMETRIC ELEMENT |
| | GEOMETRIC ELEMENT |
| | GEOMETRIC ELEMENT |
| | GEOMETRIC ELEMENT C2 |
| | GEOMETRIC ELEMENT C1 |
| | NUMBER OF GEOMETRIC ELEMENTS |
| | NAME OF PART-C |
| PART B | GEOMETRIC ELEMENT |
| | GEOMETRIC ELEMENT |
| | GEOMETRIC ELEMENT |
| | GEOMETRIC ELEMENT |
| | GEOMETRIC ELEMENT |
| | GEOMETRIC ELEMENT |
| | GEOMETRIC ELEMENT |
| | GEOMETRIC ELEMENT B2 |
| | GEOMETRIC ELEMENT B1 |
| | NUMBER OF GEOMETRIC ELEMENTS |
| | NAME OF PART-B |
| PART A | GEOMETRIC ELEMENT A2 |
| | GEOMETRIC ELEMENT |
| | GEOMETRIC ELEMENT |
| | GEOMETRIC ELEMENT |
| | GEOMETRIC ELEMENT |
| | GEOMETRIC ELEMENT |
| | GEOMETRIC ELEMENT A3 |
| | GEOMETRIC ELEMENT A2 |
| | GEOMETRIC ELEMENT A1 |
| | NUMBER OF GEOMETRIC ELEMENTS |
| | NAME OF PART-A |
| | NUMBER OF PARTS |

FIG.7

| | | |
|---|---|---|
| GEOMETRIC ELEMENT | | |
| GEOMETRIC ELEMENT | | |
| GEOMETRIC ELEMENT | | |
| GEOMETRIC ELEMENT | | |
| GEOMETRIC ELEMENT | SUB-GROUP C1 | PART C |
| GEOMETRIC ELEMENT | | |
| GEOMETRIC ELEMENT C2 | | |
| GEOMETRIC ELEMENT C1 | | |
| NUMBER OF GEOMETRIC ELEMENTS | | |
| NAME OF PART-C | | |
| GEOMETRIC ELEMENT | | |
| GEOMETRIC ELEMENT | SUB-GROUP B2 | |
| GEOMETRIC ELEMENT B1 | | |
| NUMBER OF GEOMETRIC ELEMENTS | | |
| NAME OF PART-B | | |
| GEOMETRIC ELEMENT | | PART B |
| GEOMETRIC ELEMENT | | |
| GEOMETRIC ELEMENT | | |
| GEOMETRIC ELEMENT | SUB-GROUP B1 | |
| GEOMETRIC ELEMENT | | |
| GEOMETRIC ELEMENT B2 | | |
| NUMBER OF GEOMETRIC ELEMENTS | | |
| NAME OF PART-B | | |
| GEOMETRIC ELEMENT | | |
| GEOMETRIC ELEMENT A2 | SUB-GROUP A2 | |
| GEOMETRIC ELEMENT | | |
| NUMBER OF GEOMETRIC ELEMENTS | | |
| NAME OF PART-A | | PART A |
| GEOMETRIC ELEMENT | | |
| GEOMETRIC ELEMENT | | |
| GEOMETRIC ELEMENT | SUB-GROUP A1 | |
| GEOMETRIC ELEMENT A3 | | |
| GEOMETRIC ELEMENT A1 | | |
| NUMBER OF GEOMETRIC ELEMENTS | | |
| NAME OF PART-A | | |
| NUMBER OF SUB-GROUPS | | |
| NUMBER OF PARTS | | |

FIG.8

| | |
|---|---|
| GEOMETRIC ELEMENT | ⎫ SUB-GROUP B2 |
| GEOMETRIC ELEMENT | |
| GEOMETRIC ELEMENT B1 | ⎭ |
| NUMBER OF GEOMETRIC ELEMENTS | |
| NAME OF PART-B | |
| GEOMETRIC ELEMENT | ⎫ SUB-GROUP A2 |
| GEOMETRIC ELEMENT A2 | |
| GEOMETRIC ELEMENT | |
| NUMBER OF GEOMETRIC ELEMENTS | ⎭ |
| NAME OF PART-A | |
| GEOMETRIC ELEMENT | ⎫ SUB-GROUP C1 |
| GEOMETRIC ELEMENT | |
| GEOMETRIC ELEMENT | |
| GEOMETRIC ELEMENT | |
| GEOMETRIC ELEMENT | |
| GEOMETRIC ELEMENT | |
| GEOMETRIC ELEMENT C2 | |
| GEOMETRIC ELEMENT C1 | |
| NUMBER OF GEOMETRIC ELEMENTS | ⎭ |
| NAME OF PART-C | |
| GEOMETRIC ELEMENT | ⎫ SUB-GROUP B1 |
| GEOMETRIC ELEMENT | |
| GEOMETRIC ELEMENT | |
| GEOMETRIC ELEMENT | |
| GEOMETRIC ELEMENT | |
| GEOMETRIC ELEMENT B2 | |
| NUMBER OF GEOMETRIC ELEMENTS | ⎭ |
| NAME OF PART-B | |
| GEOMETRIC ELEMENT | ⎫ SUB-GROUP A1 |
| GEOMETRIC ELEMENT | |
| GEOMETRIC ELEMENT | |
| GEOMETRIC ELEMENT A3 | |
| GEOMETRIC ELEMENT A1 | |
| NUMBER OF GEOMETRIC ELEMENTS | ⎭ |
| NAME OF PART-A | |
| NUMBER OF SUB-GROUPS | |
| NUMBER OF PARTS | |

METHOD AND APPARATUS FOR DISPLAYING CAD GEOMETRIC OBJECT AND STORAGE MEDIUM STORING GEOMETRIC OBJECT DISPLAY PROCESSING PROGRAMS

BACKGROUND OF THE INVENTION

1. Field of the Invention

The present invention relates to a method and an apparatus for processing composite geometric object data represented by combinations of a plurality of geometric elements to display the object, and to a computer readable storage medium storing programs which a computer executes to realize such geometric object data processing and displaying.

2. Description of the Related Art

A geometric object is generally represented by a plurality of sets of geometric elements such as lines having some width and faces or planes having some size. A face is painted with color in some cases. Direct processing of data of geometric element sets of a complicated geometric object is not so simple, so that geometric elements are generally divided into groups by using various indices.

Geometric objects include a two-dimensional geometric object defined on one plane such as a flat plane and a three-dimensional geometric object defined in a three-dimensional space. A three-dimensional geometric object is often displayed by projecting it on a tow-dimensional plane because a general display device has only a two-dimensional display screen.

Grouping geometric elements into units of part or component which is the basic unit capable of being disassembled or removed is often performed, particularly when an object is displayed by using a plurality of geometric elements. Namely, with this grouping method, one part is represented by a set of lines and faces, of only lines, or of only faces which constitute one group. The configuration of an object is therefore displayed by these sets, i.e., a plurality of groups of geometric elements.

Computer aided design (CAD) systems used in engineering fields are typical examples with which geometric objects are displayed by the above-described method. Main objects to be displayed are industrial products each of whose configuration is displayed by a plurality of groups each constituting one geometric object or part which is the basic unit capable of being assembled or disassembled.

For the display processing of grouped geometric data, the geometric data in a storage medium is read and processed in the sequential order of groups. Namely, after a geometric object belonging to group A is displayed completely, a geometric object belonging to group B is displayed, and so on.

Users desire that a (composite) geometric object should be displayed as fast as possible to quickly grasp the outline thereof. In order to satisfy this requirement, the following approaches have been performed in addition to simply speeding up the display processing speed.

A first approach is to progressively display a geometric object each time data is read, each time data is received via a communications line, or each time a display pre-process is performed. With this approach, a user possibly grasps the outline of a geometric object at an earlier stage when a fraction of the geometric object is displayed. This possibility is particularly high when a user judges from a partially displayed geometric object whether it is a desired one among a plurality of geometric objects. Therefore, the user can make judgement in a short time without waiting for the input and display of all data of each geometric object. This approach is also effective for changing the position and direction of display, from the same reason as above.

Figure 3:
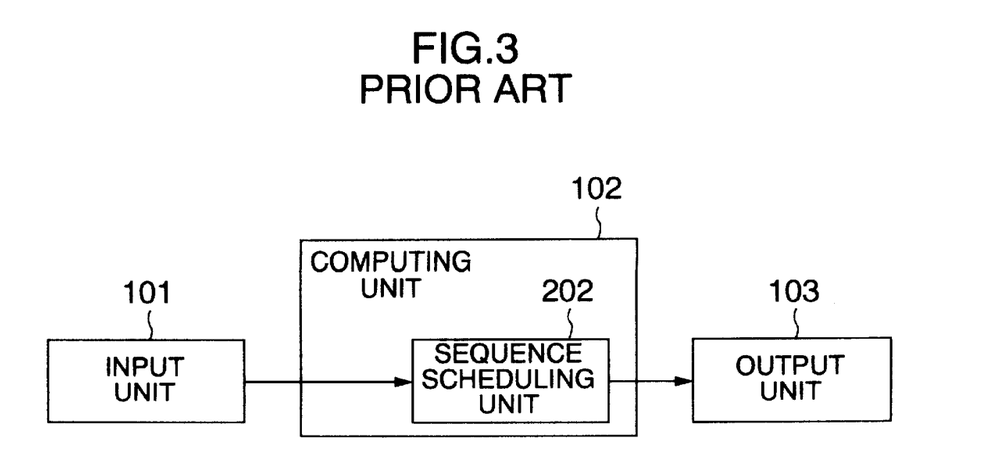
FIG. 3 is a block diagram showing an example of a geometric object display apparatus according to the prior art.

A second approach is to display each geometric object sequentially starting from a larger size object. Generally, a large size geometric object plays an important role in grasping the outline of a final geometric object constituted of a plurality of geometric objects. A system for realizing this approach is constituted of, as shown in FIG. 3, an input unit 101, a computing unit 102 and an output unit 103. The input unit 101 reads geometric data sets of a display object. The order of reading the geometric data sets is not limitative. The computing unit 102 has a sequence scheduling unit 202 which schedules the order of displaying faces of a display object in such a manner that each face is displayed in the order of larger area size. The output unit 103 displays data of each face in the scheduled order.

Figure 5:
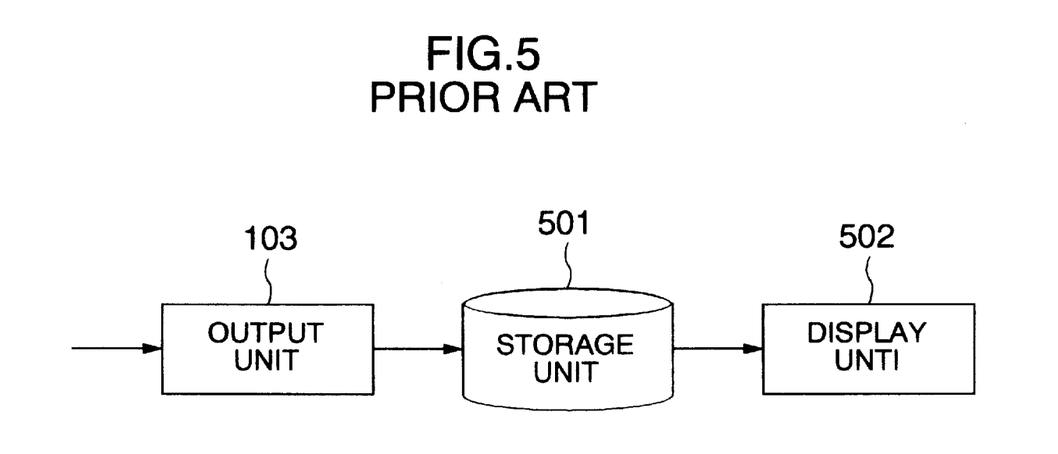
FIG. 5 is a block diagram showing an example of an already known output unit of the geometric object display apparatus shown in FIG. 1.

As shown in FIG. 5, the output unit 103 may output the scheduled geometric data to a storage unit 501 or a communications apparatus, and a display unit 502 displays the scheduled geometric data stored in the storage unit 501 or sent from the communications apparatus.

Apparatuses and methods for realizing the above approaches are disclosed in "Developments on Three-dimensional Data Viewer GhostSpace" by Daisuke, NISHIOKA and Mikio NAGASAWA, Information Processing Society of Japan, Papers of Multimedia Communications and Distributed Processing Workshop, pp. 261–266 (1996). The contents generally the same as above are disclosed in Technical Information provided by Ultra-high Speed Network and Computer Technology Laboratories (UNCL) on the Internet (http://www.iijnet.or.jp/uncl/GhostSpace/ technotej.html) as of Nov. 25, 1996, and in U.S. Pat. No. 4,994,989 and U.S. Pat. No. 5,379,371.

There are apparatuses applying such technologies which apparatuses are provided with a means for receiving a user instruction while a geometric object is displayed, identifying a geometric object corresponding to the user instruction or a group the geometric object belongs to, and displaying attribute data of the geometric object or group. Many CAD systems use these technologies to provide a function of displaying the attribute data of a part in response to a designation of the part.

There is also a means for displaying a progress of how far the process such as data input advances, by using a one-dimensional bar graph. For example, computer software, word processor MS-WORD (trade name) of Microsoft Corp., displays a progress state of a data read or save process.

Conventional technologies of the above-described two approaches are, however, not satisfactory in that they consider grouped geometric data processing not so much. Specifically, although geometric data is grouped, each face (geometric element) constituting the geometric object is simply displayed in the order of larger area size, without positively utilizing the characteristics of grouping.

Therefore, if the configuration of a composite geometric object such as a mechanical apparatus is displayed as a set of geometric elements in the unit of face simply in the order of larger area size, then a small part having a narrow area size is displayed only near at the last stage of the display process.

In the case of a composite geometric object such as a mechanical apparatus, the configuration as well as a presence/absence of each part becomes important when the outline of a final geometric object is grasped. It is therefore preferable to display an independent part at an earlier stage even if it is small in size. This is particularly preferable when a process is to be performed in response to a designation of a part made for the display of attribute data such as material and manufacturer other than for the display of the configuration. With conventional apparatuses and methods, however, a small part is not displayed until the near final stage of the display process, so that an earlier designation of a small part is not possible. A composite geometric object such as a mechanical apparatus is generally grouped in the unit of part, for the convenience of data management and the like.

The above problem is also associated with wire-frame (line drawing) representation of a geometric object.

The conventional display method of displaying each face in the order of larger area size may be associated with another display method of displaying a geometric object in the order of group size, e.g., in the order of volume size. Also with this method, it is obvious that a small part is displayed later, and the above problem cannot be solved.

The outline of geometric objects occupying a large space, such as buildings and a row of houses on a street, can be grasped at an earlier stage if a near geometric object is displayed with a priority over a far geometric object. The outline can be grasped at a much earlier stage if a larger geometric element is displayed preferentially in addition to the preferential display of a near geometric element. However, geometric object display methods and apparatuses have not been proposed to date which can display each geometric element in the priority order thereof, independently from a geometric group such as each building and each room.

Only a one-dimensional display means has been proposed for the display of a progress state of a display process. Therefore, for example, while a plurality of parts are displayed, it is not possible to display how far the process of displaying each part is advanced.

SUMMARY OF THE INVENTION

It is an object of the invention to solve the above problems, to provide a geometric object display method and apparatus for displaying a composite geometric object constituted of a plurality of geometric elements, capable of making easy to grasp the outline of the composite geometric object at an earlier stage while only partial geometric element data is displayed, and to provide a computer readable storage medium storing programs which the computer executes to realize such a method.

It is another object of the invention to provide a geometric object display method and apparatus capable of grasping the outline of each part represented by a plurality of geometric elements and constituting a composite geometric object (product) at an earlier stage while only partial geometric element data is displayed, and capable of giving an instruction relative to the grasped part, and to provide a computer readable storage medium storing programs which the computer executes to realize such a method.

It is a further object of the invention to provide a geometric object display method and apparatus capable of grasping at an earlier stage the outline of geometric objects occupying a large space such as buildings and a row of houses on a street, by displaying at an earlier stage a particular geometric object near at a view point to be highly attended to, and to provide a computer readable storage medium storing programs which the computer executes to realize such a method.

It is a still further object of the invention to provide a geometric object display method and apparatus capable of grasping a progress state of a display process as a composite function of part size and geometric element size, and to provide a computer readable storage medium storing programs which the computer executes to realize such a method.

The completion degree of a display of a composite geometric object represented by a plurality of geometric elements becomes higher as the display process of geometric elements progresses. The sequential order of displaying geometric elements plays an important roll in grasping the outline of a composite geometric object at an earlier stage with a low display completion degree.

The fundamental concept of the invention resides in that in a display process of displaying groups of geometric elements in a predetermined display sequence, at least one geometric element contained in each of all groups is displayed at a stage when, for example, 50% of all geometric elements to be finally displayed are displayed.

More specifically, geometric elements in each group are divided into a plurality of sub-groups in accordance with a parameter such as the number of geometric elements, the number of groups, and a processing speed of the apparatus, the display sequence of the sub-groups of each group are scheduled to display each geometric element of each sub-group in accordance with the scheduled display sequence.

The display sequence scheduling is performed by using an index such as the size or distance of a geometric element in each group. For example, if the geometric elements of each group is divided into two sub-groups each having the same number of geometric elements, a portion (50%) of geometric elements contained in each group of all the groups can be displayed at the stage when 50% of all geometric elements are processed. If the geometric elements of each group is divided into ten sub-groups each having the same number of geometric elements, a portion (10%) of geometric elements contained in each group of all the groups can be displayed at the stage when 10% of all geometric elements are processed. If the division into sub-groups is determined so that a portion of geometric elements contained in each group of all the groups can be displayed at the stage when 1 to 5% of all geometric elements are processed, the geometric object display becomes very convenient. The sub-grouping method is not limited only to the division into sub-groups each having the same number of geometric elements, but the group may be divided into sub-groups each having a different number of geometric elements.

The scheduling of each sub-group may be performed in the order of larger size area of geometric elements in each group or in the order of nearer distance to a view point. If the geometric element group is a part, the scheduling may be performed in the order of larger volume, earlier shipping date or the like of the part.

DETAILED DESCRIPTION OF THE PREFERRED EMBODIMENTS

Figure 1:
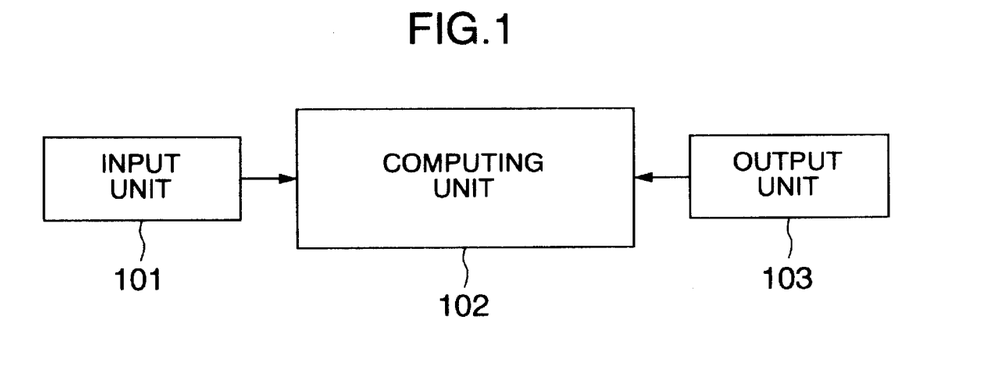
FIG. 1 is a block diagram showing the basic structure of a geometric object display apparatus according to an embodiment of the invention.

Embodiments of the invention will be described with reference to the accompanying drawings. FIG. 1 illustrates in the basic block form an embodiment for realizing an apparatus most preferable to reduce the invention into practice by using a general computer. The apparatus is constituted of an input unit 101, a computing unit 102 and an output unit 103. The computer may be a personal computer, which is also effective for obtaining the advantageous effects of the invention.

Figure 6:
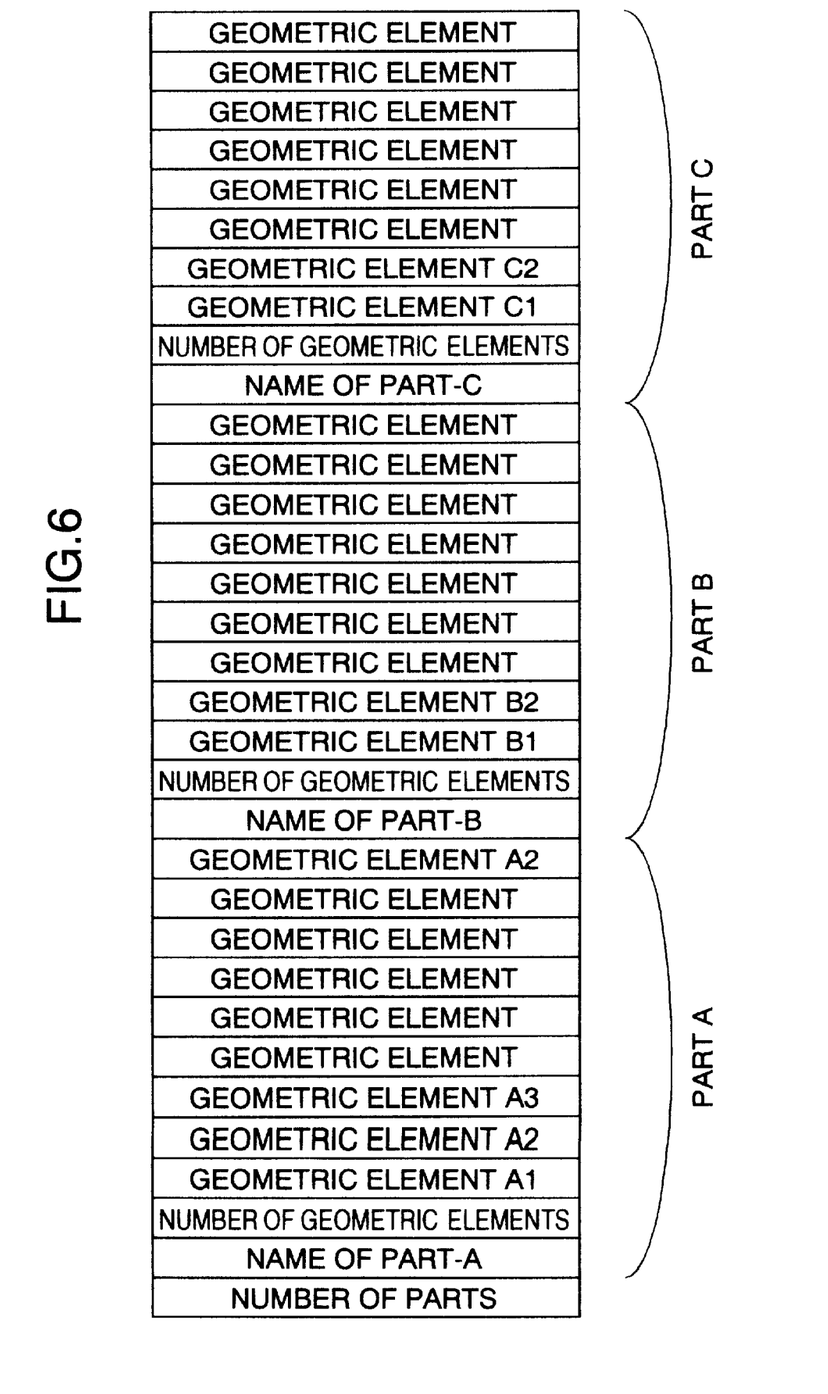
FIG. 6 shows an example of input geometric data.

The input unit 101 reads geometric data of a display object, the geometric data being possibly CAD geometric data. This geometric data is constituted of, for example as shown in FIG. 6, geometric element data, part data constituted of geometric element data, and total composite geometric object data constituted of part data. Namely, the data is grouped in the unit of part.

The grouping style of geometric data of this invention is not limited only to the above style. For example, optional data for identifying a combination of geometric data, such as the number of geometric elements and the number of parts and the name of each part, may be added. Parts which are unnecessary to be handled independently from each other may be bundled as a single part. An input source for geometric data may be a file stored in a magnetic disk storage device or the like, or may be data received via a network. The input source of this invention is not limited only to the above sources.

Figure 2:
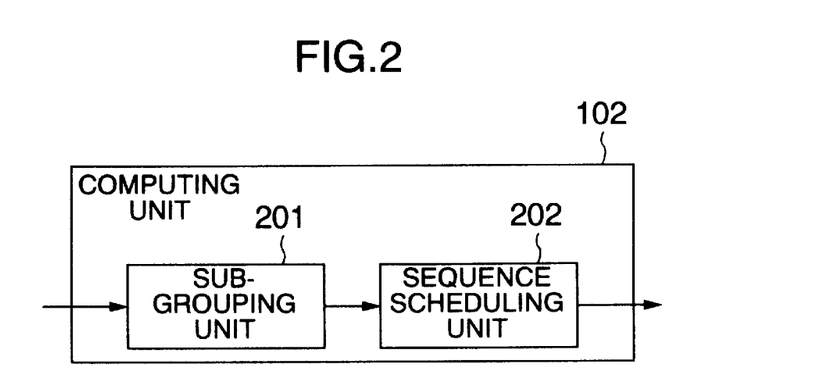
FIG. 2 is a block diagram showing an example of an internal structure of a computing unit of the geometric object display apparatus shown in FIG. 1.

As shown in FIG. 2, the computing unit 102 has a sub-grouping unit 201 and a sequence scheduling unit 202.

The sub-grouping unit 201 divides the input geometric data of each group representative of each part into sub-groups in accordance with a predetermined rule. The sub-grouping rule includes, for example, (a) a rule by which each part is divided into a plurality of geometric element sub-groups in accordance with the size of each geometric element (face and edge), (b) a rule by which each part is divided into a plurality of geometric element sub-groups in accordance with the distance to each geometric element from a certain view point, and (c) a rule by which each part is divided into a plurality of geometric element sub-groups in accordance with attribute data added to each geometric element, such as a color and a color density of a geometric element, a date when geometric element data was generated, and a date when a part is to be shipped. Each of these rules in the program/data form is selectively used. The size of a geometric element includes a face size and an edge size. Indices for the face may be the area size of the face, the area size, radius, side length or the like of a minimum rectangle, circle or the like surrounding the face, whereas indices for the edge may be the length of the edge, the volume, area size, radius or the like of a minimum rectangular parallelepiped, sphere, rectangle, circle or the like surrounding the edge. The sub-grouping method include, for example, (d) a method by which the number of geometric elements in each sub-group of each part (group) is made equal, (e) a method by which the distribution of sizes and distances is made equal, and (f) a method by which the number of geometric elements or the distribution of sizes and distances is not made equal but is set to a predetermined ratio.

The number of sub-groups in each group exerts influence on the time required for displaying a portion of geometric elements contained in each group of all the groups. If the geometric elements of each group is divided into two sub-groups each having the same number of geometric elements, a portion (50%) of geometric elements contained in each group of all the groups can be displayed at the stage when 50% of all geometric elements are processed. If the geometric elements of each group is divided into ten sub-groups each having the same number of geometric elements, a portion (10%) of geometric elements contained in each group of all the groups can be displayed at the stage when 10% of all geometric elements are processed. Assuming that the display process time of each geometric element is the same, the above-described predetermined ratio in (f) is a ratio relative to the time required for performing the display process for all geometric elements and completely displaying a composite geometric image. The above-described sub-grouping methods are only illustrative and it is not necessary to divide each group into sub-groups having the same number of geometric elements. The number of divisions of each group may be determined in accordance with the feature of each group, so that a partial geometric object (a portion of a composite geometric object) can be displayed in a suitable shape at as earlier stage as possible. As an example of irregular division, a product such as an electric vacuum cleaner having 500 parts and 10,000 part faces was used and a personal computer (PC) having a processing speed of 200 MHz was used. When the numbers of sub-groups were set to 10 to 30 for displaying portions of geometric elements contained in all groups, a geometric object display capable of grasping the final geometric object was able to be displayed at the stage when 1 to 5% of the display process was performed.

Figure 4:
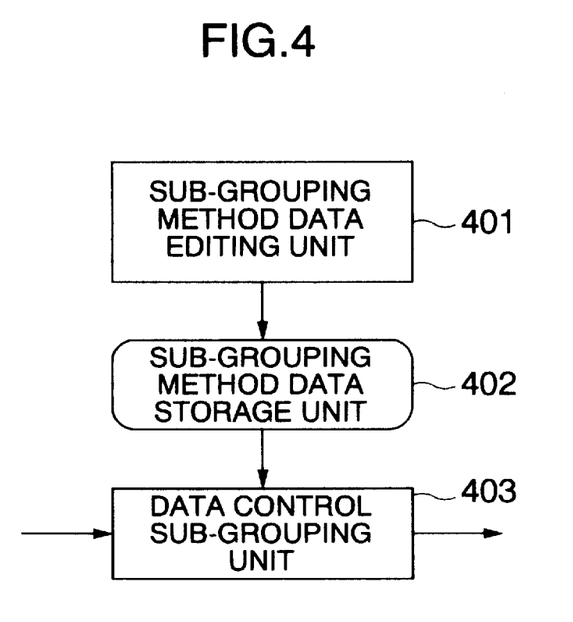
FIG. 4 is a block diagram showing a modification of a sub-grouping unit of the computing unit shown in FIG. 2.

The sub-grouping unit 201 may be configured as shown in FIG. 4. Specifically, a sub-grouping method data editing unit 401 receives and edits sub-grouping method data representative of the sub-grouping method, and the edited data is stored in a sub-grouping method data storage unit 402. In accordance with the stored data, a data control grouping unit 403 divides geometric data into sub-groups. With this arrangement, a user can select the characteristics of the geometric object display apparatus and method, in accordance with the features of a geometric object, e.g., in accordance with whether the number of sub-groups is large or not or whether a difference between the numbers of sub-groups is large or not.

Figure 10:
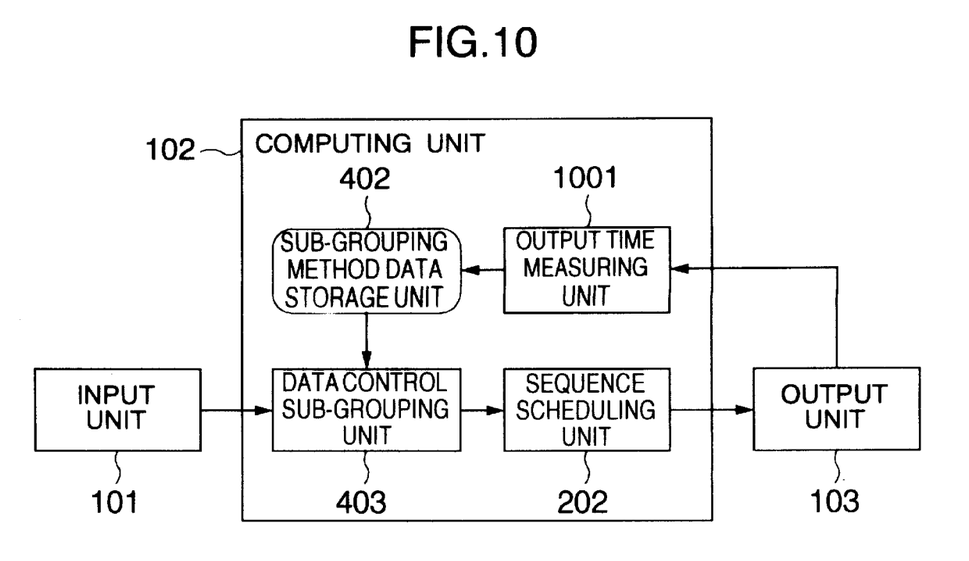
FIG. 10 is a block diagram showing a modification of a geometric object displaying apparatus of the invention in which a geometric data sub-grouping method is changed in accordance with a display output time.

The computing unit 102 of the invention may be configured as shown in FIG. 10 in order to perform the sub-grouping method for geometric data. Specifically, geometric data sub-grouped by the data control sub-grouping unit 403 is scheduled by the sequence scheduling unit 202 and displayed (output) by the output unit 103. The time required for the display (output) of geometric data of each sub-group or a plurality of sub-groups is measured by an output time measuring unit 1001, the measured results are stored in the sub-grouping method data storage unit 402, and in accordance with the stored data, the sub-grouping method at the next display process may be changed by the data control sub-grouping unit 403. With this arrangement, proper sub-grouping can be performed by any type of a geometric object display apparatus with whose processing speed the measured time (measured results) changes.

Figure 7:
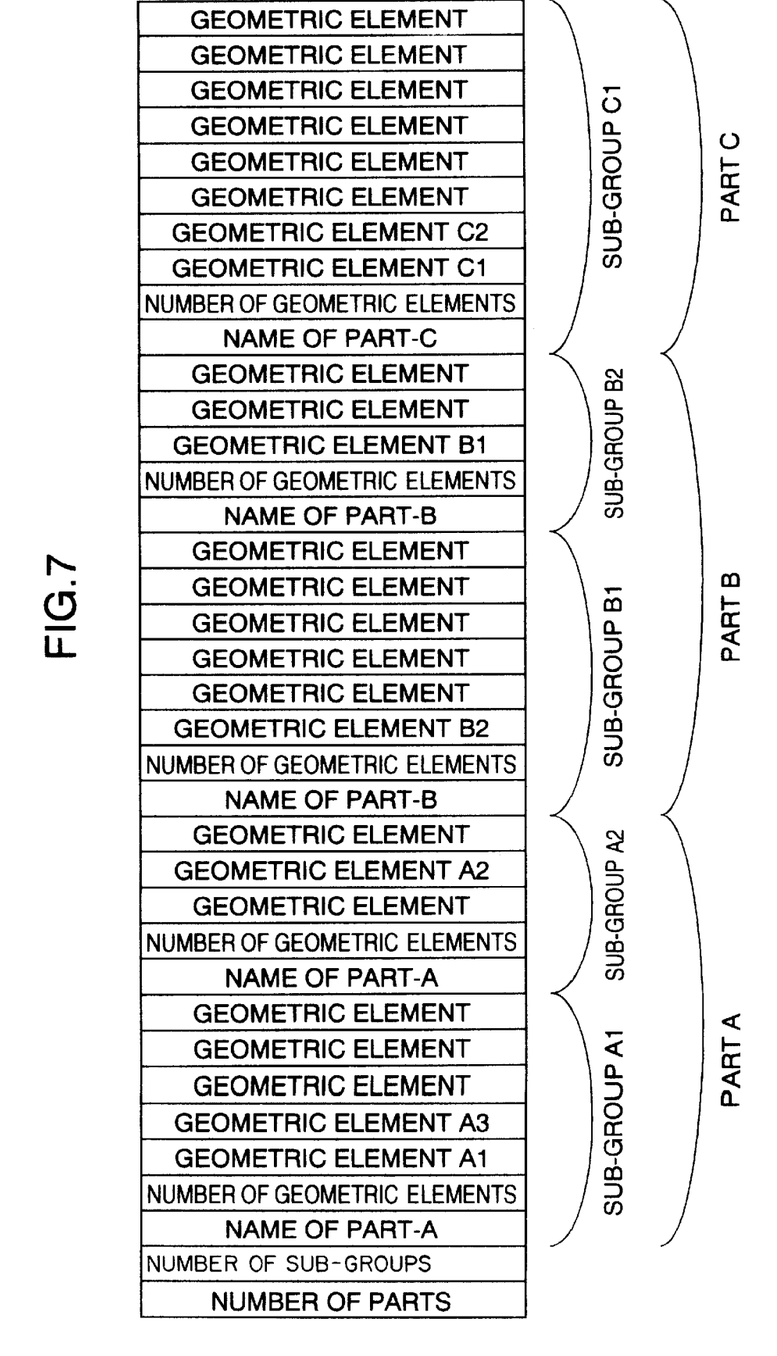
FIG. 7 shows an example of sub-grouped geometric data.

FIG. 7 shows an example of sub-grouped data. Geometric element data of each of parts A and B is divided into two sub-groups. Each sub-group is added with data representative of the name of a part and the number of geometric elements. All geometric element data belonging to the part A is distributed into sub-groups A1 and A2 in accordance with the rule used by the sub-grouping unit 201, 403. Similarly, all geometric element data belonging to the part B is distributed into sub-groups B1 and B2 in accordance with the rule used by the sub-grouping unit 201, 403. The part name and the number of geometric elements which are management data for the part and sub-group are added to each sub-group through copy or renewal, in accordance with the feature of geometric data. In addition to these part name and geometric element number, data representative of the position, color or the like of each part may be used as the management data.

The sequence scheduling unit 202 determines a display sequence of each sub-group. With the most preferable method (apparatus), the display sequence is determined in the following manner. The geometric element sub-groups are sequentially picked up. First, the geometric element sub-group having the largest size or nearest to the view point is picked up from sub-groups of each part, and second, the geometric element sub-group having the second size or second nearest to the view point is picked up. In this manner, the geometric element sub-groups are picked up until the last geometric element sub-group of the last part is picked up. In this case, although the parts may also be scheduled in accordance with the size or distance thereof, such display sequence is not necessarily required. The display sequence of the invention is not limited only to the above-described display sequence. For example, the priority of display sequence may be determined in accordance with attribute values affixed to each part and sub-group, the attribute values including material, color, color density of each part, date of data formation, and the like. The scheduling may be suspended in the midst of data display, or may be partially omitted, if necessary. It is also unnecessary to give all the parts the same display sequence, because the number of sub-groups of each part may be different.

Figure 8:
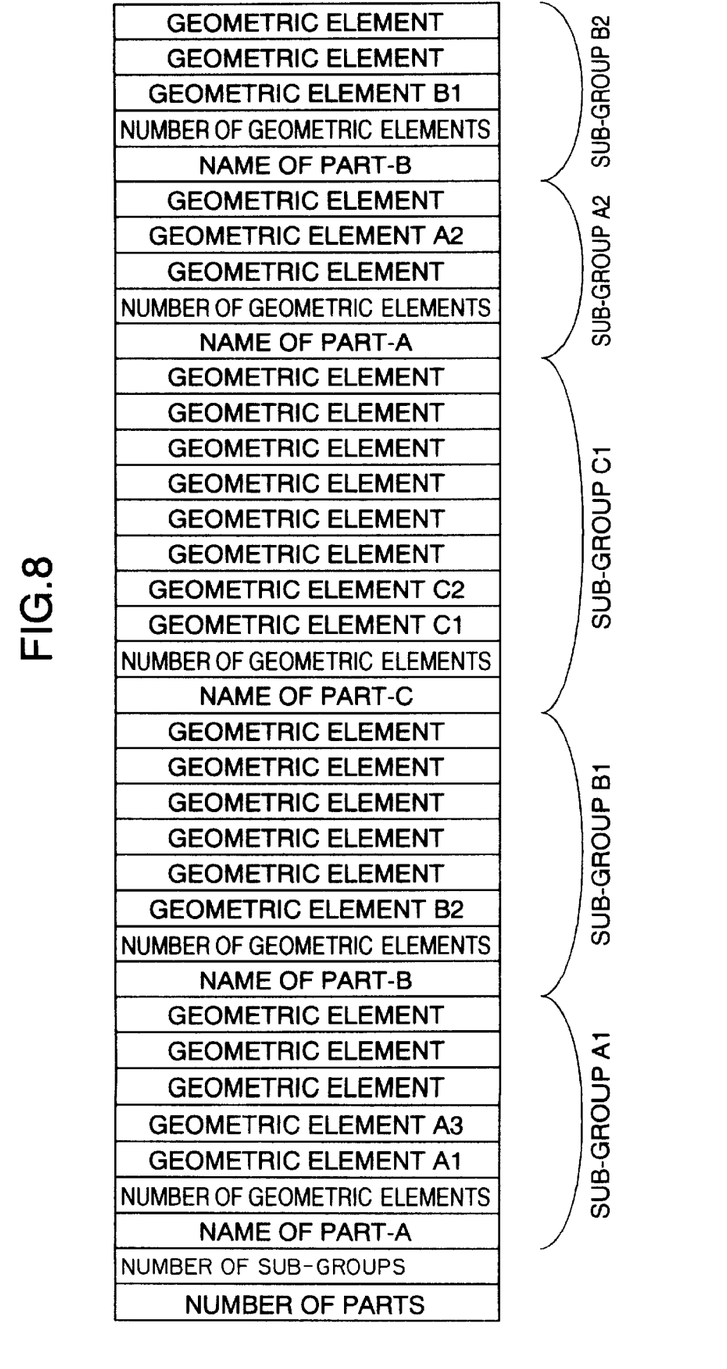
FIG. 8 shows an example of sequence scheduled geometric data.

FIG. 8 shows an example of sequence scheduled geometric element data. In this example, the sequence of the sub-groups divided as shown in FIG. 7 is changed by rewriting it. Instead, the original sequence may be stored as it is without rewriting it, and the new sequence may be generated additionally.

The output unit 103 outputs (displays) the geometric element data on the basis of the scheduled sub-group unit. The output unit 103 may be configured as shown in FIG. 5 in which the output unit 103 outputs the scheduled geometric element data to the storage unit 501 or to a communications apparatus, and another output unit 502 reads the stored data and displays it in place of the output unit 103. The structure of the output unit 103 of the invention is not limited only to the above cases. In the above example, the geometric element data is output in the sequence shown in FIG. 8.

Figure 13A:
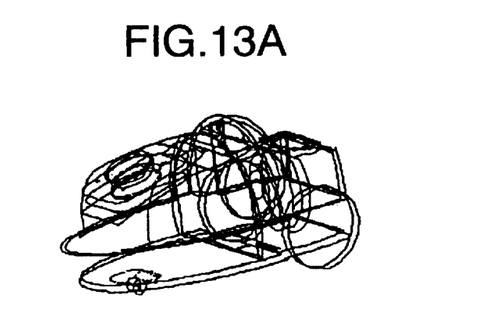
FIGS. 13A to 13H are projected views showing examples of images displayed time sequentially by the geometric object display method (FIGS. 13A to 13D) of the invention and by the conventional geometric object display method (FIGS. 13E to 13H).
Figure 13B:
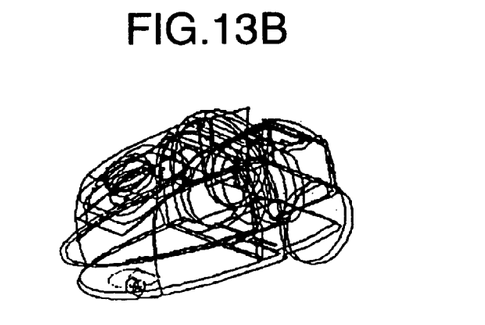
Figure 13C:
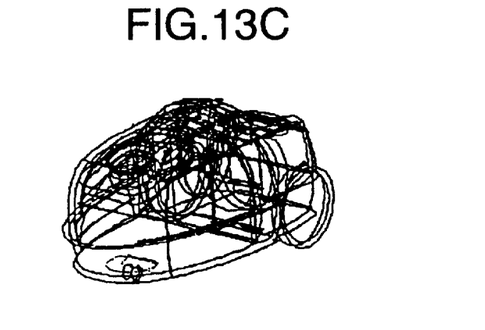
Figure 13D:
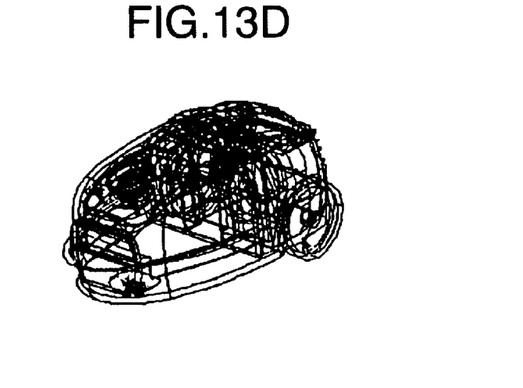

FIGS. 13A to 13D show examples of the outputs (displays), in the form of line-frame, of an electric vacuum cleaner, as obtained by using the embodiment method and apparatus. FIGS. 13E to 13H show comparison examples as obtained by a conventional method and apparatus. As the geometric object display starts, the displays are obtained in the order from FIG. 13A, FIG. 13B and to FIG. 13C, and the last display of FIG. 13D is finally obtained. As the same geometric element data is displayed in the display sequence of larger part size by a conventional geometric object display method, the displays are obtained in the order from FIG. 13E, FIG. 13F and to FIG. 13G, and the last display of FIG. 13H same as FIG. 13D is finally obtained.

As seen from the intermediate display progress states of this invention shown in FIGS. 13A to 13C, the outline of the electric vacuum cleaner is displayed in the shape easy to grasp, and in addition all parts are displayed partially.

Figure 13E:
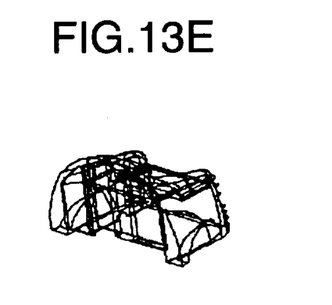
Figure 13F:
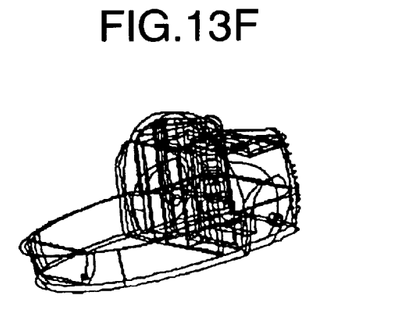
Figure 13G:
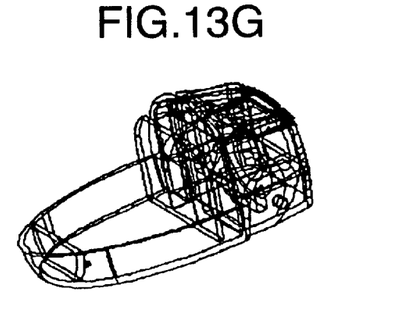
Figure 13H:
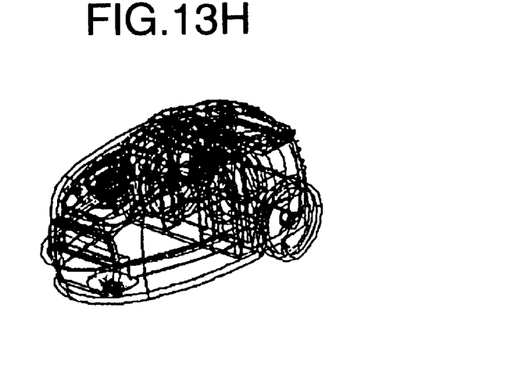

In contrast, as seen from the intermediate display progress states obtained by the conventional geometric object display method shown in FIGS. 13E to 13G, only some parts are displayed in detail and the outline is displayed in the shape difficult to grasp, irrespective of the display of geometric element data by generally the same amount as FIGS. 13A to 13C.

Figure 9:
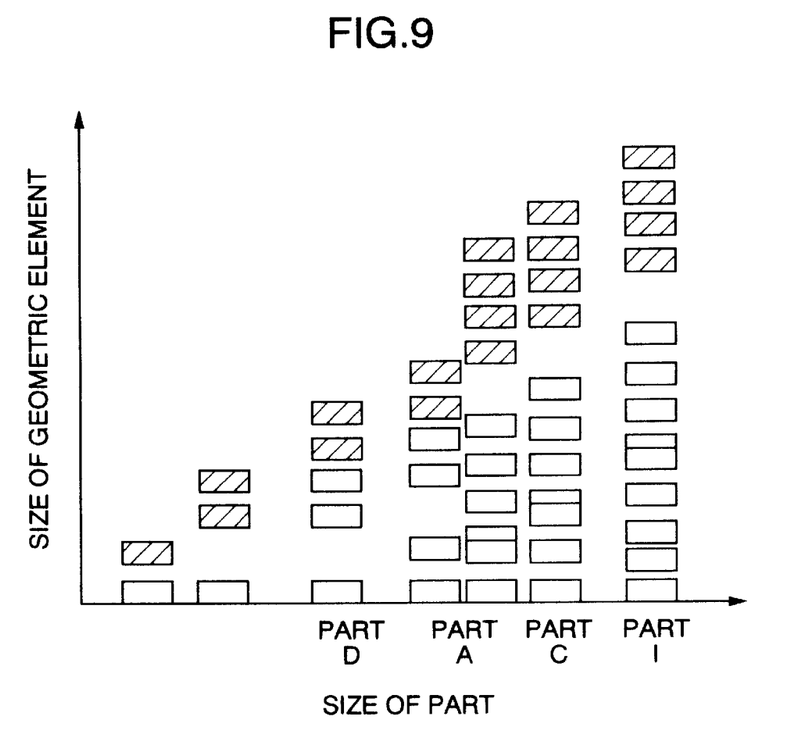
FIG. 9 is a diagram showing an example of displaying a progress state of a display process.

If the amount of geometric element data is bulky or if a user is to be notified of a progress state or a final time, it is preferable to present a progress state of the display process. An embodiment realizing this is provided with a function of displaying a progress state of the display process in the form of graphical representation such as shown in FIG. 9. In this example shown in FIG. 9, all geometric elements of a composite geometric object are represented by a rectangular frame. The abscissa of the graph represents the size of a part each geometric element belongs to, and the ordinate represents the size of each geometric element. The geometric element whose display process was completed is discriminated by hatching its frame. A percentage of the number of hatched rectangular frames is equal to the percentage of the number of geometric elements whose display processes were completed.

Figure 11:
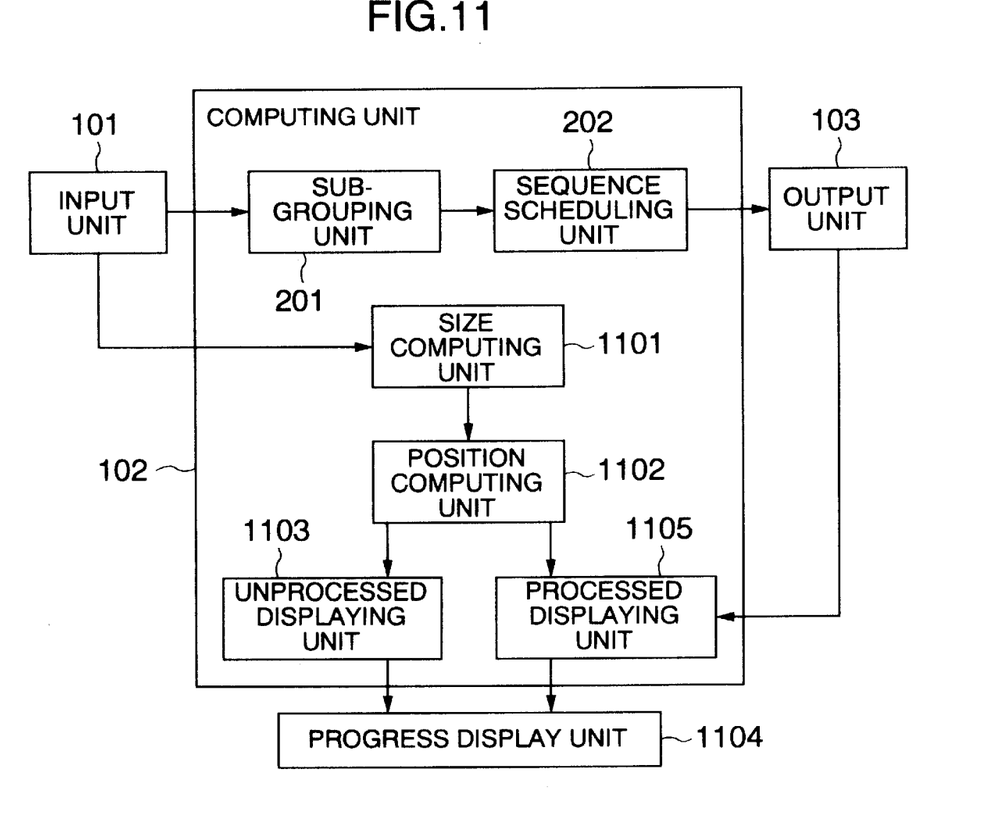
FIG. 11 is a block diagram showing a modification of a geometric object displaying apparatus of the invention in which a progress state of a geometric object display process is displayed.

Such a display process may be realized by process steps illustrated in FIG. 11. A size computing unit 1101 calculates the sizes of each geometric element and the corresponding part in accordance with the geometric element data supplied from the input unit 101. The size is preferably represented by a geometric area or volume. If it is sufficient to present only a rough progress state, the size may be represented by the volume, diameter or the like of a rectangular parallelepiped, sphere or the like surrounding the geometric element or part. A position computing unit 1102 calculates the position on the graph in accordance with the sizes of each geometric element and each part. In accordance with the position data on the graph, an unprocessed displaying unit 1103 makes a progress display unit 1104 display an unprocessed mark (a frame without hatching). A processed displaying unit 1105 measures the progress state at the output unit 103, and in accordance with the measured progress states and the position data on the graph, makes the progress display unit 1104 display a processed mark (a frame with hatching). The output unit 103 may be used also as the progress display unit 1104. In this case, for example, the display screen of the output unit 103 is partitioned to form a geometric object display area and a progress display area, and the graph such as shown in FIG. 9 is displayed in the latter area.

Although a plurality of functions have been described independently in the above, these functions are combined in practical use.

Figure 14:
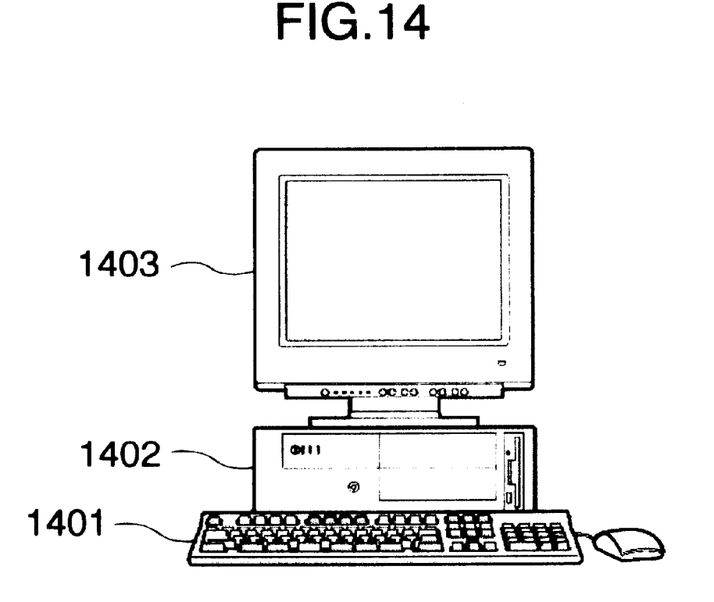
FIG. 14 is a front view of a general computer system to be used for performing the geometric object display method of the invention.

A geometric object display apparatus may be an apparatus dedicated only to performing the embodiment method. The apparatus may also be realized by using a general computer system and display process programs running on the computer system. Such a computer system has a keyboard 1401, a computer main frame 1402 and a display 1403. The computer main frame 1402 has an input unit for inputting geometric element data and display process programs described above, a storage unit for storing data and programs, and a calculation unit.

Figure 15:
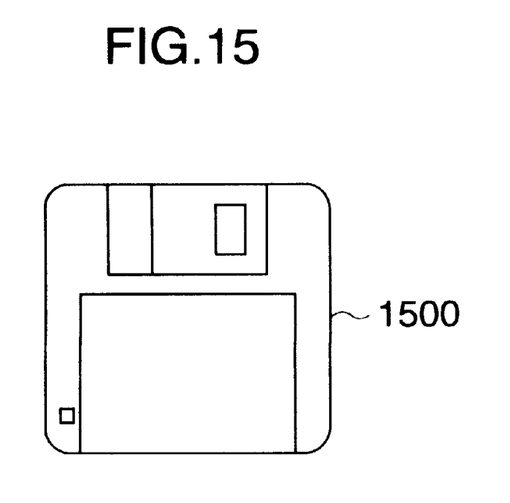
FIG. 15 is a plan view of a magnetic disk for storing programs which a general computer system executes to realize the geometric object display method of the invention.
Figure 16:
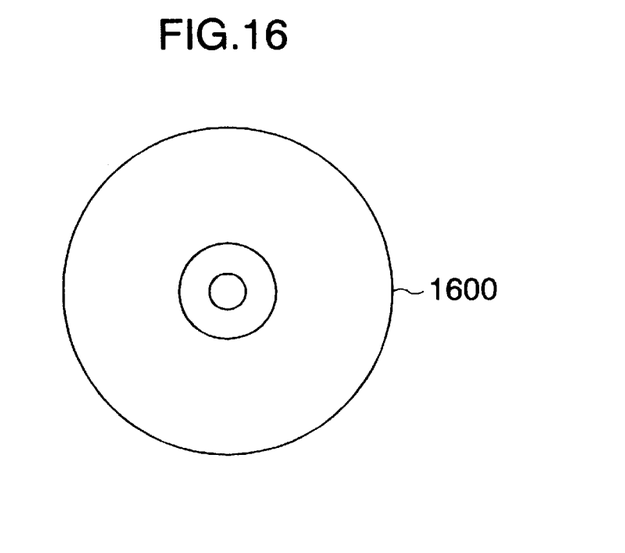
FIG. 16 is a plan view of a CD-ROM for storing programs which a general computer system executes to realize the geometric object display method of the invention.

In order to load display process programs in such a general computer system, the programs are stored in a storage medium including a magnetic disk (floppy disk) 1500 such as shown in FIG. 15 and a CD-ROM 1600 such as shown in FIG. 16. The storage medium is shipped or taken into custody, and when shipped it is loaded in a magnetic disk drive or a CD-ROM drive of the computer main frame 1402 to read the display process programs from the storage medium. If the display process programs are distributed via a communications network, the input unit reads the programs which are stored in a storage medium such as a magnetic disk. This storage medium can be used thereafter repetitively.

Although the geometric element data to be processed by the embodiment apparatus is preferably three-dimensional data, two-dimensional geometric element data may also be used.

Figure 12:
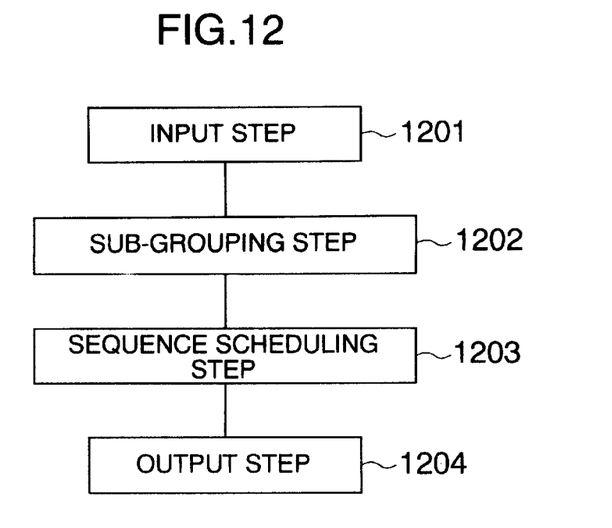
FIG. 12 is a flow chart illustrating a geometric object display method of the invention to be executed by a computer system.

The embodiment apparatus executes the geometric object display process basically at steps 1201 to 1204 shown in FIG. 12.

First, at an input step 1201, data of a composite geometric object data generated through CAD or the like is input. As shown in FIG. 6, the composite geometric object data is constituted of geometric element data, part data made of a combination of geometric element data, and composite geometric object data made of a combination of part data. This input process is the same as the input process of a general computer system, and so the detailed description thereof is omitted.

At a sub-grouping step 1202, the input geometric element data is divided into sub-groups as shown in FIG. 7, in accordance with a predetermined rule. The details of this sub-grouping step will be later given.

At a sequence scheduling step 1203, the display sequence of the divided sub-groups is determined as shown in FIG. 8, in accordance with a predetermined rule. The details of this sequence scheduling step will be later given.

Lastly, at an output step 1204, the geometric element data contained in each sub-group is output or displayed in the unit of scheduled sub-group. This display process in the unit of scheduled sub-group is the same as the display process of a general computer system, and so the detailed description thereof is omitted.

Figure 17:
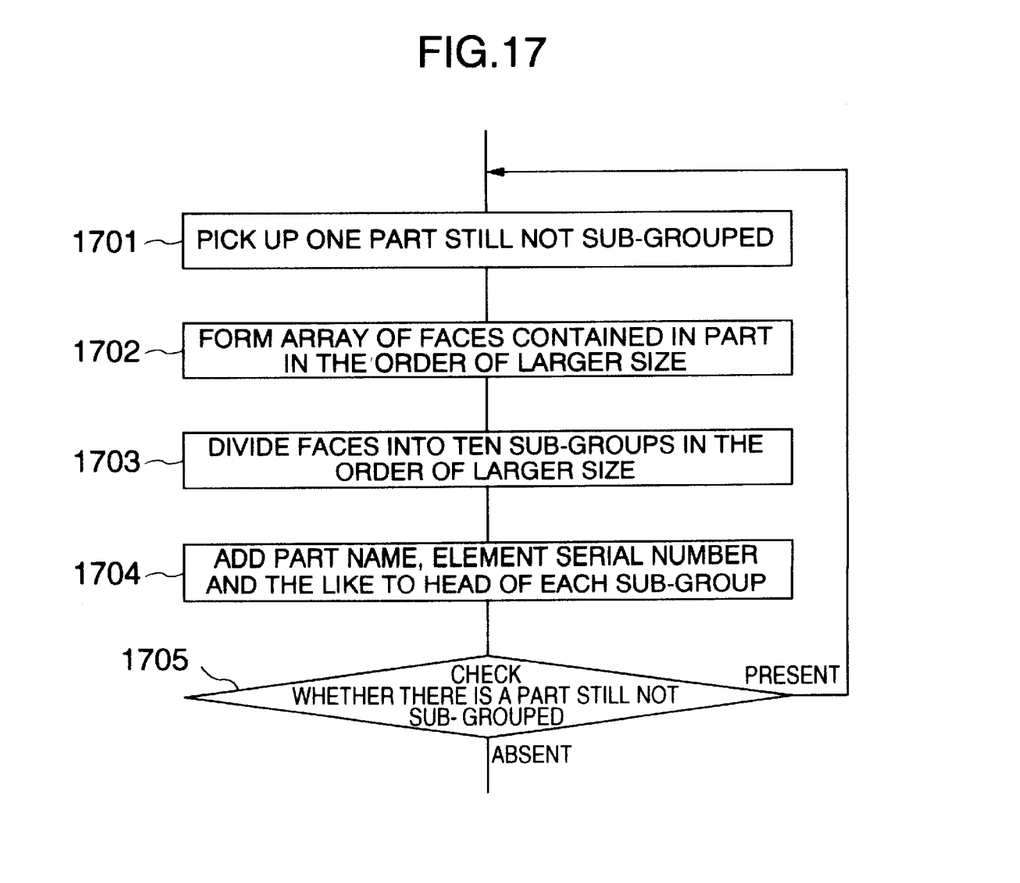
FIG. 17 is a flow chart illustrating a sub-grouping process which a general computer system performs to realize the geometric object display method of the invention.

FIG. 17 is a flow chart illustrating the details of the sub-grouping step 1202. At the sub-grouping step 1202, first one of parts still not sub-grouped is picked up in a predetermined order (e.g., the order of larger size) (step 1701), and faces as display elements of the picked-up part are arrayed in the order of larger area size (step 1702). The size of a face may be other indices such as its size area, a volume of a minimum rectangular parallelepiped, sphere or the like surrounding the face. Next, the arrayed faces are divided into sub-groups, for example, ten sub-groups in the order of larger size (step 1703). As described earlier, there are many sub-grouping methods and any one of them may be used. Each sub-group is affixed with management information such as a part name (step 1704). Optional information may be added as the management information, or may not be added if not necessary.

Lastly, it is checked whether there is a part still not sub-grouped. It not, the flow returns to step 1701 of the sub-grouping process (step 1705). The sub-grouping process continues or repeats until it becomes that there is no unprocessed part.

Figure 18:
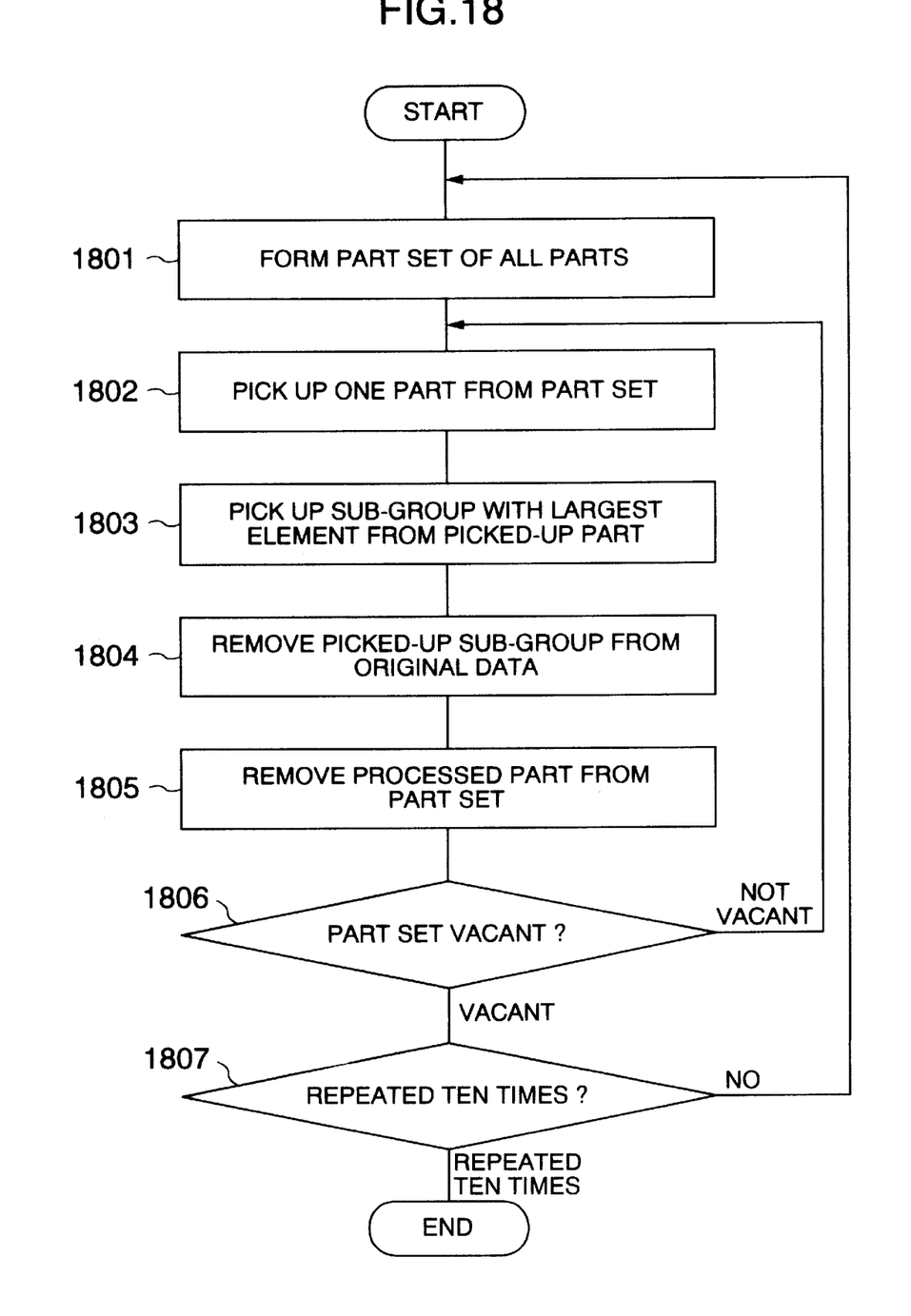
FIG. 18 is a flow chart illustrating a sequence scheduling process which a general computer system performs to realize the geometric object display method of the invention.

FIG. 18 is a flow chart illustrating the details of the sequence scheduling step 1203. At the sequence scheduling step 1203, first, a set of all parts of a composite geometric object is formed (step 1801). Next, one part is picked up from the part set in a predetermined order (step 1802), and a sub-group containing a largest geometric element (e.g., face) is picked up from the sub-groups of the part (step 1803). The picked-up sub-group is removed from the original part data (step 1804), and a processed part is removed from the part set (step 1805). Next, it is checked whether the part set is vacant, and if not, the steps 1802 to 1806 are repeated (step 1806), whereas if vacant, it is checked whether these steps 1801 to 1806 are repeated the number of sub-groups of each part (in this example, ten times). If not, the flow returns to step 1801, whereas if repeated, the sequence scheduling process is terminated (step 1807).

According to the invention, in displaying a composite geometric object made of a combination of a plurality of geometric elements, it becomes easy to grasp the outline of the composite geometric object at an earlier stage when only partial geometric element data is displayed. It is therefore possible to identify a part of a product having a composite geometric object made of a combination of geometric elements and give an instruction relative to the identified product, at an earlier stage when only partial geometric element data is displayed.

Further, in displaying geometric objects occupying a large space such as buildings and a row of houses on a street, it is possible to grasp at an earlier stage the outline of a particular geometric object near at a view point to be highly attended to.

Still further, the progress state of display process can be known as a composite function of a part size and a geometric element size.

What is claimed is:

1. A method of displaying a geometric object represented by a plurality of groups of geometric elements, comprising the steps of:

deriving geometric element data from a data source of geometric elements to be finally displayed; and in accordance with the derived geometric element data, displaying at least one geometric element contained in each of all the groups to be displayed finally, until 50% of all the geometric elements to be finally displayed is displayed.

2. A method of displaying a geometric object represented by a plurality of groups of geometric elements, comprising the steps of:

inputting geometric element data of the geometric object to be displayed;

sub-grouping the geometric elements contained in each group of the input geometric element data into a plurality of sub-groups;

scheduling the display sequence of the sub-groups of each group; and outputting the geometric elements in each sub-group in accordance with the scheduled display sequence of each sub-group.

3. A method of displaying a geometric object according to claim 2, wherein said sub-grouping step is performed in accordance with an index of the size of each geometric element in each group.

4. A method of displaying a geometric object according to claim 2, wherein said sub-grouping step is performed in accordance with an index of the distance of each geometric element in each group.

5. A method of displaying a geometric object according to claim 2, wherein said scheduling step is performed in accordance with the order of larger size area of each geometric element in each group.

6. A method of displaying a geometric object according to claim 2, wherein said scheduling step is performed in accordance with the order of nearer distance, to a view point, of each geometric element in each group.

7. A method of displaying a plurality of three-dimensional geometric objects each containing faces and edges as geometric elements, comprising the steps of:

deriving geometric element data from a data source of geometric elements to be displayed; and displaying at least one face or edge constituting each of all the three-dimensional geometric objects to be displayed finally, until 50% of all the three-dimensional geometric objects to be finally displayed is displayed.

8. A method of displaying a plurality of three-dimensional geometric objects in the unit of geometric element and sequentially in the order of larger volume, comprising the steps of:

deriving geometric element data from a data source of geometric elements to be displayed; and displaying at least one face or edge as the geometric element constituting each of all the three-dimensional geometric objects to be displayed finally, until the three-dimensional geometric object of the largest volume is displayed.

9. An apparatus for displaying a composite geometric object represented by a plurality of groups of geometric elements, comprising:

a memory for storing data of groups of geometric elements supplied from a data source of the geometric elements of the composite geometric object; and display means connected to said memory for reading the geometric element data from said memory and processing the read geometric element data in such a manner that at least geometric element contained in each of all the groups to be displayed finally, is displayed until 50% of all the geometric elements to be finally displayed is displayed.

10. An apparatus for displaying a composite geometric object represented by a plurality of groups of geometric elements, comprising:

a memory for storing geometric element data of the composite geometric object;

sub-grouping means for reading the geometric element data from said memory and sub-grouping the geometric elements of each group into a plurality of sub-groups;

scheduling means for determining the display sequence of the sub-groups of each group in accordance with a predetermined condition; and outputting means for outputting the geometric elements of each sub-group in accordance with the display sequence of each sub-group determined by said scheduling means.

11. An apparatus according to claim 10, wherein said sub-grouping means sub-groups in accordance with an index of the size of each geometric element in each group.

12. An apparatus according to claim 10, wherein said sub-grouping means sub-groups in accordance with an index of the distance of each geometric element in each group.

13. An apparatus according to claim 10, wherein said scheduling means determines a priority display sequence in accordance with the order of larger size area of each geometric element in each group.

14. An apparatus according to claim 10, wherein said scheduling means determines a priority display sequence in accordance with the order of nearer distance, to a view point, of each geometric element in each group.

15. An apparatus for displaying a plurality of three-dimensional geometric objects, comprising:

a memory for storing geometric element data of the plurality of three-dimensional geometric objects; and display processing means for reading the geometric element data from said memory and processing the read geometric element data in such a manner that at least one face or edge as the geometric element constituting each of all the three-dimensional geometric objects to be displayed finally, is displayed until 50% of all the three-dimensional geometric objects to be finally displayed is displayed.

16. An apparatus for displaying a plurality of three-dimensional geometric objects in the order of larger volume, comprising:

a memory for storing data of geometric elements constituting each of the plurality of three-dimensional geometric objects; and display processing means for reading the geometric element data from said memory and processing the read geometric element data in such a manner that at least one face or edge as the geometric element constituting each of all the three-dimensional geometric objects to be displayed finally, until the three-dimensional geometric object of the largest volume is displayed.

17. A computer readable storage medium storing a program which the computer executes to perform a process of displaying a geometric object represented by a plurality of groups of geometric elements, said program comprising:

programming means for storing data of the groups of geometric elements to be displayed, in a memory; and programming means for processing the data stored in the memory in such a manner that at least one geometric element contained in each of all the groups to be displayed finally, is displayed until 50% of all the geometric elements to be finally displayed is displayed.

18. A computer readable storage medium storing a program which the computer executes to perform a process of displaying a composite geometric object represented by a plurality of groups of geometric elements, said program comprising the steps of:

storing data of the groups of geometric elements to be displayed, in a memory;

sub-grouping the geometric elements contained in each group of the data stored in the memory, into a plurality of sub-groups;

scheduling the display sequence of the sub-groups of each group; and outputting the geometric elements in each sub-group in accordance with the scheduled display sequence of each sub-group.

19. A computer readable storage medium according to claim 18, wherein said sub-grouping step is performed in accordance with an index of the size of each geometric element in each group.

20. A computer readable storage medium according to claim 18, wherein said sub-grouping step is performed in accordance with an index of the distance of each geometric element in each group.

21. A computer readable storage medium according to claim 18, wherein said scheduling step is performed in accordance with the order of larger size area of each geometric element in each group.

22. A computer readable storage medium according to claim 18, wherein said scheduling step is performed in accordance with the order of nearer distance, to a view point, of each geometric element in each group.

23. A computer readable storage medium storing a program which the computer executes to perform a process of displaying a plurality of three-dimensional geometric objects each containing faces and edges as geometric elements, said program comprising:

programming means for deriving geometric element data from a data source of geometric elements of the three-dimensional geometric objects; and programming means for processing the derived geometric element data in such a manner that at least one face or edge constituting each of all the three-dimensional geometric objects to be displayed finally, is displayed until 50% of all the three-dimensional geometric objects to be finally displayed is displayed.

24. A computer readable storage medium storing a program which the computer executes to perform a process of displaying a plurality of three-dimensional geometric objects in the order of larger volume, said program comprising the steps of:

deriving geometric element data from a data source of geometric elements to be displayed; and displaying at least one face or edge as the geometric element constituting each of all the three-dimensional geometric objects to be displayed finally, until the three-dimensional geometric object of the largest volume is displayed.

25. A method of displaying a geometric object with a computer by sequentially displaying a plurality of geometric elements of a display object divided into a plurality of groups, comprising the steps of:

storing data of all the grouped geometric elements of the display object in a memory; and processing the geometric element data stored in the memory to sequentially display the geometric elements of the display object of each group so that a display contains at least one geometric element of each group, when a designated display completion degree of the display object is obtained.

26. A method according to claim 25, wherein the designated display completion degree of the display object is determined in accordance with a parameter including the number of parts of the display object, the number of faces of each part, and the processing speed of the computer.

27. A method according to claim 25, wherein the designated display completion degree of the display object is represented by a display completion of 50% of all the geometric elements of the display object.

28. A method of displaying a geometric object with a computer by sequentially displaying a plurality of three-dimensional geometric objects as a display object in the unit of geometric object including a face and an edge, comprising the steps of:

storing data of geometric elements of each three-dimensional geometric object of the display object in a memory; and processing the geometric element data stored in the memory so that a display contains at least one face or edge of each of all three-dimensional geometric objects constituted of faces and edges, when a designated display completion degree of the display object displayed by sequentially displaying the geometric elements of each three-dimensional geometric object, is obtained.

29. A computer readable storage medium storing a program which the computer executes to perform a process of displaying a composite geometric object as a computer aided design display object represented by a plurality of geometric elements divided into a plurality of groups, said program comprising:

programming means for storing CAD geometric data of all the grouped geometric elements of the display object in a memory; and programming means for processing the CAD geometric data stored in the memory to sequentially display the geometric elements of the display object of each group so that a display contains at least one geometric element of each group, when a designated display completion degree of the display object is obtained.

30. A storage medium according to claim 29, wherein the designated display completion degree of the display object is determined in accordance with a parameter including the number of parts of the display object, the number of faces of each part, and the processing speed of the computer.

31. A storage medium according to claim 29, wherein the designated display completion degree of the display object is represented by a display completion of 50% of all the geometric elements of the display object.

32. A storage medium storing a program which a computer executes to perform a process of displaying a plurality of three-dimensional geometric objects as a display object in the unit of a geometric element including a face and an edge, said program comprising:

programming means for storing CAD geometric data representative of geometric elements of each three-dimensional geometric object of the display object in a memory; and programming means for processing the CAD geometric element data stored in the memory so that a display contains at least one face or edge of each of all three-dimensional geometric objects constituted of faces and edges, when a designated display completion degree of the display object displayed by sequentially displaying the geometric elements of each three-dimensional geometric object, is obtained.

* * * * *